June 10, 1924.
A. D. LIGHTNER ET AL
MEANS FOR SUPPORTING AUTOMOBILES IN FREIGHT CARS
Filed Feb. 13, 1918     2 Sheets-Sheet 2
1,496,782
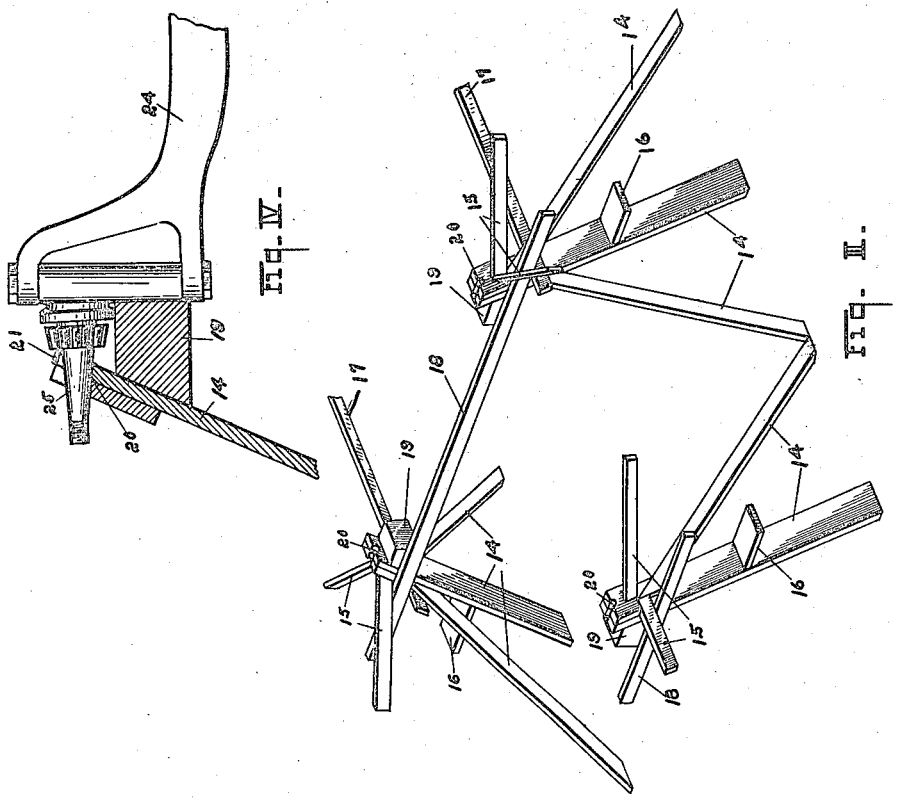
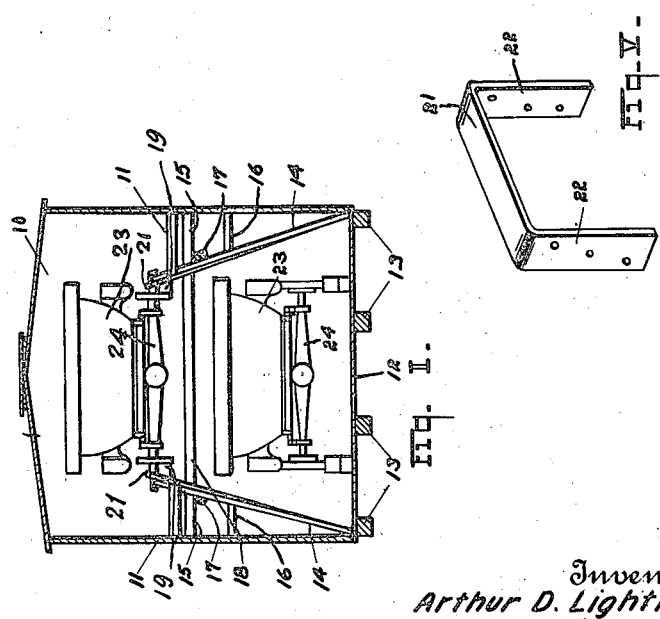
Inventors
Arthur D. Lightner
Fred H. Thompson
By Chester H Braselton
Attorney Patented June 10, 1924.

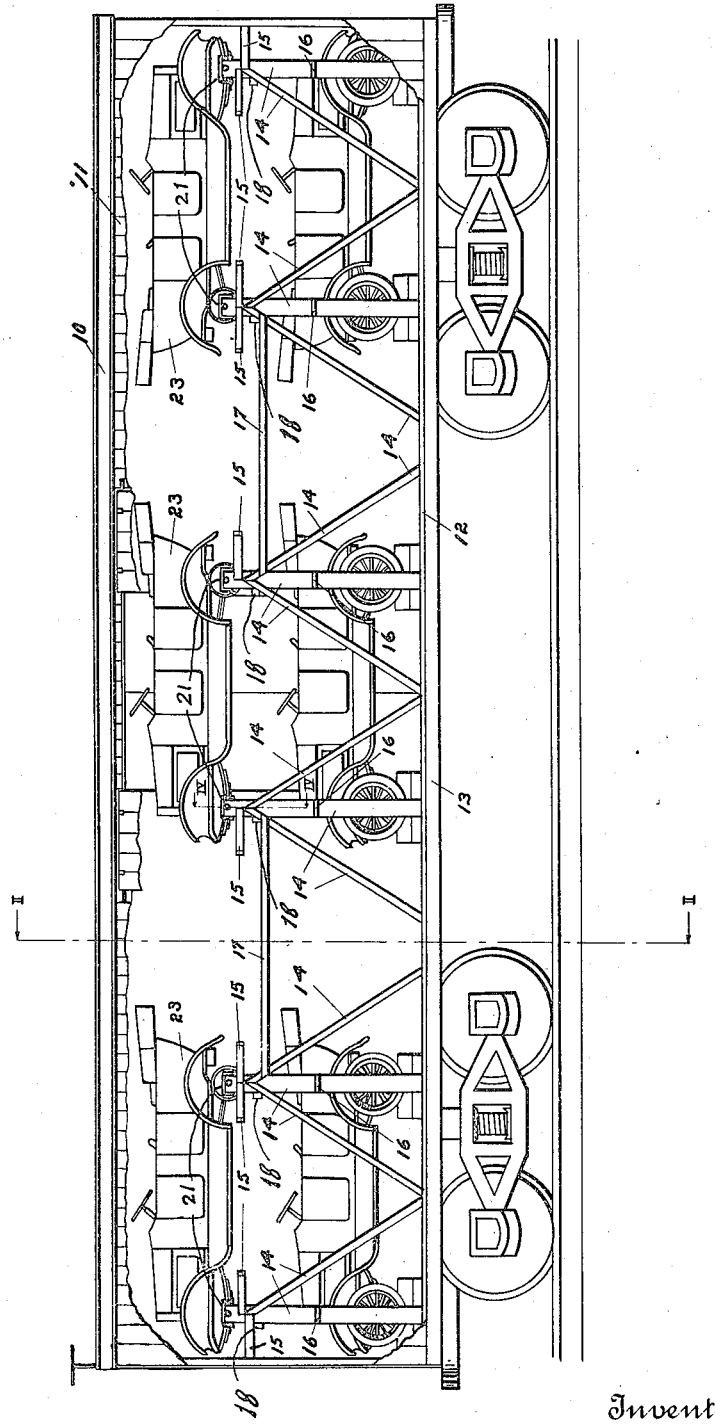

1,496,782

UNITED STATES PATENT OFFICE.

ARTHUR D. LIGHTNER AND FRED H. THOMPSON, OF TOLEDO, OHIO, ASSIGNORS, BY MESNE ASIGNMENTS, TO THE STUDEBAKER CORPORATION, A CORPORATION OF NEW JERSEY, AND THE COPONY AUTO LOADING COMPANY, A CORPORATION OF MICHIGAN.

MEANS FOR SUPPORTING AUTOMOBILES IN FREIGHT CARS.

Application filed February 13, 1918. Serial No. 216,883.

*To all whom it may concern:*

Be it known that we, ARTHUR D. LIGHTNER and FRED H. THOMPSON, citizens of the United States, residing at Toledo, in the county of Lucas and State of Ohio, have invented certain new and useful Improvements in Means for Supporting Automobiles in Freight Cars, of which we declare the following to be a full, clear, and exact description.

This invention relates to means for supporting automobiles in freight cars.

The principal object of our invention is to provide an improved system of bracing and support by means of which automobiles may be so supported in freight cars that one automobile may be loaded above the other in the freight car, such system of loading being popularly known as "double decking."

A further object of our invention is to provide such a system of bracing and support as will so support the automobiles within the freight car as to guard against injury due to stresses and strains which come upon the structure while the freight car is moving, and to accomplishing this purpose with the greatest economy of lumber and labor which is possible.

A further object of our invention is to provide a system of bracing and support for loading automobiles in freight cars in which the supports are so tied together as to make substantially a continuous bracing and supporting structure throughout the length of the car, this result being accomplished with the maximum economy of labor and material.

Further objects, and objects relating to economies of manufacture and details of construction, will definitely appear from the detailed description to follow.

We accomplish the objects of our invention by the devices and means described in the following specification. Our invention is clearly defined and pointed out in the appended claims.

A structure constituting a preferred embodiment of our invention is illustrated in the accompanying drawing, forming a part of this specification, in which:

Fig. I is a view in side elevation of a freight car having constructed therein a system of bracing and support embodying our invention, the side of the freight car being broken away for convenience in showing the bracing members, and six automobiles being shown loaded in the freight car by this system of bracing and support.

Fig. II is a transverse sectional view taken substantially on the line II—II of Fig. I.

Fig. III is a detail, perspective view of a section of the bracing and supporting system.

Fig. IV is a detail, sectional view taken substantially on the line IV—IV of Fig. I, and Fig. V is a detail, perspective view of one of the straps used at the upper end of the supporting tripod to retain the wheel spindle in place thereon.

In the drawing, similar reference numerals refer to similar parts throughout the several views, and the sectional views are taken looking in the direction of the little arrows at the ends of the section lines.

Considering the numbered parts of the drawing, we have shown a freight car 10 having side walls 11 and a floor 12 supported on the sills 13. In the freight car we construct a plurality of tripods which are made up of the members 14, the lower ends of said members being secured to the floor 12 of the freight car at the side thereof and the upper ends converging to a common apex so that the tripod formed by these members 14 lies in a plane which is inclined to the vertical, as clearly shown in Fig. II of the drawing. A brace made up of the members 15 extends between the apex of the tripod made up of the members 14 and the side wall 11 of the freight car. Another brace 16 extends between the central member 14 of the tripod and the side wall of the car, said brace 16 being disposed about midway between the upper and lower ends of the tripod. Four of these tripods made up of the three members 14 ar● provided for the centrally arranged automobile which is to be supported within the freight car in an elevated position; and, in the freight car shown in Fig. I, eight of these tripods are used, together with four duplex supports each composed of two legs or members 14 instead of three legs. The duplex supports are arranged at the opposite ends of the freight car for the support of the front axles of the end automobiles of the upper tier. The brace members 15 of the duplex, or end, supports have a slightly different relative arrangement due to the fact that one of said members contacts the end of the car and the other contacts the side of the car. Three of the automobiles are loaded in the elevated position, and three other automobiles are loaded beneath the first three. The axles of the automobiles of the upper tier are supported at their ends upon a tripod, or a duplex support, according to the location of the automobiles, as clearly shown in Figure I.

Stringers 17 connect the tripods supporting one end of each automobile with the tripods supporting the adjacent end of the next automobile, as clearly shown in Fig. I. Cross braces 18 are secured to the apex of each pair of tripods and are substantially as long as the width of the freight car 10 so that the ends of the cross braces 18 abut the side walls 11 of the freight car, and thus prevent a lateral shifting of the tripods relative to the freight car. A block 19 is secured to the apex of each tripod, which block extends in a horizontal plane inwardly therefrom, so as to abut against the end of the axle which is supported on said tripod. The upper end of the central member 14 of each tripod is provided with a groove 20 in which the wheel spindle 25 of the corresponding axle 24 rests, said spindle being retained in place in said notch or groove 20 by means of the tie strap 21 which passes over the same, the ends 22 of said tie strap being secured to the edges of the central member 14 of the tripod. The automobile is represented at 23, the axles at 24 and the wheel spindles at 25.

From the description of the parts given above, the operation of this system of bracing and support should be very readily understood. In connection with the construction of a suitable system for bracing and supporting automobiles when loaded in elevated position within a freight car, there are a number of forces which come into play and which must be given careful consideration. In the first place, adequate support must be given for the dead weight of the automobile. In the system of bracing and support which we have constructed, the dead weight of the automobile is taken directly by the supports made up of the members 14, and is transmitted by said supports, which extend in a plane inclined to the vertical, to the floor 12 and the side sills 13 which support the floor, the ends of said members 14 being firmly fastened to the floor at the sides of the car. A portion of the dead weight of the automobile is also transmitted to the side walls 11 of the freight car, through the side braces 15 and 16, which extend in a vertical plane, as the tendency of the dead weight of the car is to make the members 14 swing upon a fulcrum formed by their connection with the floor of the car. This movement is resisted by the braces 15 and 16. The cross brace member 18 which extends from one wall to the other of the freight car, also tends to resist any such swinging movement and hence assists in taking up and resisting the dead weight of the automobile. It will, of course, be apparent that when a freight car is moving in traffic and is being shunted about the tracks, it frequently meets with sudden impacts and impulses which operate in a direction longitudinally of the car. The tendency of such impulses would be to cause the automobiles to swing longitudinally of the car, and this tendency is resisted and met by means of the stringers 17 which connect certain of the tripods, and effectually prevent any such movement. It will be apparent that, when an automobile is supported on the tripods, the frame of the automobile acts as a brace between the tripods which support the front and rear axles and hence, when the automobile frames are considered in connection with the stringers 17, it will be apparent that a brace work is presented which extends longitudinally from one end of the car to the other and prevents any shifting of the supporting system longitudinally of the car. Furthermore, when a freight car rounds a curve in the track at a considerable rate of speed, a centrifugal force is generated which, acting on the automobiles 23 which are supported in an elevated position, will tend to shift the tripods and supporting frame work laterally. This movement is adequately resisted by means of the cross braces 18 and the braces 15 and 16, so that by means of these cross braces a bracing structure is formed which prevents a lateral shifting movement as these cross braces form a bracing structure which extends substantially from one side wall 11 of the freight car to the other. Under traffic conditions a freight car sometimes meets with an impact at one end which is resisted at the other end with the result that the side walls of the freight car tend to bulge apart. Under certain conditions, this might tend to separate the apexes of the tripods so as to allow the automobiles to drop from their support on the tripods and consequently injure the car loaded beneath it. Any such action is prevented by means of the cross brace 18, which prevents any separation of the apexes of the tripods due to the bulging of the side walls of the car 11.

In loading automobiles when using this system of bracing and support, the automobiles which are to be stored in elevated position are first hoisted into the upper part of the car by means of chain falls and the supports are then erected beneath the ends of the axles. The automobile is then lowered until the wheel spindles rest in the notches 20 at the upper ends of the supports and the straps 21 are placed over the ends of the supports and the ends 22 of said straps secured thereto so that the wheel spindles are retained in position. The cross stringers 18 are then nailed in position so that the supports are securely anchored in place. Another automobile may then be stored beneath the first, as shown in Figs. I and II of the drawing. After the automobiles are all decked in the car, as shown in Fig. I, the stringers 17 are nailed in position which tie the tripod and supporting structures together and prevent any shifting longitudinally of the car.

We are aware that the particular embodiment of our invention, which we have here shown and described, is susceptible of considerable variation without departing from the spirit thereof, and, therefore, we desire to claim our invention broadly, as well as specifically, as indicated by the appended claims.

Having thus described our invention, what we claim as new and desire to secure by Letters Patent, is:

1. Means for supporting automobiles in elevated position in a freight car comprising a tripod disposed in a plane inclined to the vertical and supporting one end of each axle of the automobile, the lower end of each tripod being secured to the floor of the car at the side thereof; a brace extending in a horizontal plane between each tripod and the side wall of said freight car between the ends of said tripod; braces connecting the upper end of said tripod and the side wall of said car, said braces extending in a horizontal plane; and means connecting the apexes of opposite tripods to prevent lateral separation of said apexes.

2. Means for supporting automobiles in elevated position in a freight car comprising tripods disposed in inclined planes and supporting each end of each axle of an automobile, the lower end of each tripod being secured to the floor of the freight car adjacent to the side thereof; horizontal braces extending between the apex of each tripod and the side wall of the freight car; a horizontal brace extending between each tripod and the side wall of said freight car between the ends of said tripod; a cross brace connecting the apexes of opposite tripods and extending from one side wall of the freight car to the other; and means for tying said tripods together longitudinally.

3. Means for supporting automobiles in a freight car in elevated position comprising a plurality of tripods disposed in planes inclined to the vertical, the lower end of each tripod being secured to the floor of said freight car at the side thereof and the upper end of each tripod supporting one end of each axle of an automobile; brace members extending between each tripod and the side wall of said freight car in a horizontal plane; cross braces extending from one side wall of the freight car to the other and connecting the apexes of opposite tripods to prevent lateral shifting thereof; and stringers extending longitudinally from one tripod to the next adjacent tripod supporting another automobile to prevent longitudinal shifting of said tripods.

4. Means for supporting an automobile in elevated position in a freight car comprising a plurality of tripods, each having its base secured to the floor of the freight car at the side thereof and its apex disposed beneath one end of an axle of an automobile, said tripods being disposed in planes inclined to the vertical; cross braces extending from one side wall of the freight car to the other, and secured to the apexes of opposite tripods; brace members lying in a horizontal plane and connecting each tripod with the side wall of the freight car; and longitudinally extending stringers connecting tripods disposed beneath adjacent automobiles.

5. A decking system of the class described, comprising the combination of a freight car having a plurality of spaced supports at each side of the car extending upwardly and inwardly therefrom, and transversely extending members connecting the upper ends of said supports.

6. A decking system of the class described, comprising the combination of a freight car having a plurality of spaced supports at each side of the car extending upwardly and inwardly therefrom, longitudinally extending members connecting the supports at each side of the car, and transversely extending members connecting the upper ends of said supports.

7. A decking system of the class described, comprising the combination of a freight car having a plurality of spaced supports adjacent each side of the car and extending upwardly from the floor thereof, transversely extending members connecting said supports, and braces interposed between said supports and the sides of the car.

8. A decking system of the class described, comprising the combination of a freight car having a plurality of spaced supports extending upwardly from the floor of the car, transversely extending members connecting said supports, longitudinally extending members connecting the supports at each side of the car, and braces interposed between the said supports and the sides of the car.

9. A decking system of the class described, comprising the combination of a freight car having a plurality of spaced supports extending upwardly from the floor of the car, transversely extending members connecting said supports, and convergently arranged braces interposed between the upper ends of said supports and the sides of said car.

10. A decking system of the class described, comprising the combination of a freight car having a plurality of spaced supports extending upwardly from the floor of the car, transversely extending members connecting said supports, longitudinally extending members connecting said supports at each side of the car, and convergently arranged braces interposed between said supports and the sides of said car.

11. A decking system of the class described, comprising the combination of a freight car having a plurality of spaced supports extending upwardly from the floor of the car, transversely extending members having their opposite ends connected with the sides of the car, said members being also connected with said supports, and laterally extending braces connected with the upper ends of said supports, said braces being adapted to engage the side walls of the car.

12. A decking system of the class described, comprising oppositely arranged triangular supports, connecting members between the upper ends of said supports, and convergently arranged braces for said supports.

13. A decking system comprising oppositely arranged triangular supports, transversely extending connecting members between the upper ends of said triangular supports, longitudinally extending braces between said supports, and convergently arranged braces for said triangular supports.

14. The system of means for supporting automobiles in freight cars comprising a plurality of supports arranged to sustain a tier of automobiles in alignment longitudinally of the car; means for bracing certain of the supports against the sides of the car; and means for bracing the remaining supports against both the sides and ends of the car.

15. The system of means for supporting automobiles in freight cars comprising a plurality of supports arranged to sustain a tier of automobiles in alignment longitudinally of the car; means for bracing certain of the supports against the sides of the car; means for bracing the remaining supports against both the sides and ends of the car; and means for connecting and bracing said supports in pairs transversely of the car.

16. The system of means for decking automobiles one above another in a plurality of tiers extending lengthwise of the car, comprising supports arranged to embrace one tier of automobiles and sustain another; means for bracing the supports against the sides of the car; and independent means for bracing the supports at opposite ends of the tiers against the ends of the car.

17. The system of means for decking automobiles one above another in a plurality of tiers extending lengthwise of the car, comprising supports arranged to embrace one tier of automobiles and sustain another; means for connecting the supports in pairs transversely of the car and extending from side-to-side of the car for bracing the supports; and means for bracing the supports at opposite ends of the tiers against the ends of the car.

18. The system of means for decking automobiles one above another in a plurality of tiers extending lengthwise of the car, comprising supports arranged to embrace one tier of automobiles and sustain another; means for connecting and bracing the supports in pairs lengthwise of the car; and independent means for bracing the supports at opposite ends of the tiers against the ends of the car.

19. The system of means for supporting automobiles in freight cars comprising a plurality of tripods arranged to sustain a tier of automobiles in alignment longitudinally of the cars and above the floor thereof; a plurality of duplex supports associated with the tripods for sustaining the end automobiles of the tier; means for bracing the tripods against the sides of the cars; means for bracing the supports against the ends of the cars; and means for bracing the tripods and supports in pairs transversely of the cars, substantially as described.

20. The combination with a freight car, of a vehicle therein, and a supporting structure for the vehicle formed of a brace member operatively engaging said vehicle, and inclining downwardly and laterally therefrom and in a direction lengthwise of the vehicle, a second brace member adjacent said first referred to brace member and operatively engaging said vehicle and inclining downwardly and laterally away from the vehicle, and in a direction lengthwise of the vehicle opposite that in which said first referred to brace member extends, and a frame supported in the car adjacent a wall of the latter and with which ends of said brace members operatively engage at points above the car floor.

In testimony whereof, we affix our signatures.

ARTHUR D. LIGHTNER.
FRED H. THOMPSON.